Patented Dec. 2, 1952

2,620,307

UNITED STATES PATENT OFFICE 2,620,307

LUBRICATING OIL

William T. Stewart, El Cerrito, and Alfred Goldschmidt, Oakland, Calif., assignors to California Research Corporation, San Francisco, Calif., a corporation of Delaware No Drawing. Application December 16, 1950,
Serial No. 201,255

7 Claims. (Cl. 252—52)

The present invention relates to the preparation of novel and useful lubricating oil compositions. More particularly, the invention has to do with the preparation of lubricating oil compositions comprising mineral oil, polyalkylene glycol polymeric material, and a specified polar liquid compound, whereby the miscibility characteristics of blends of mineral oil and polyoxyalkylene polymeric material are substantially improved.

Polyalkylene glycol polymeric mixtures having the structural configuration

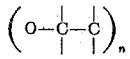

wherein $n$ is an integer greater than one and the free valences may be satisfied with hydrogen atoms and/or organic radicals, such as methyl, ethyl, propyl radicals, etc., have hitherto been proposed as synthetic lubricants. These materials may be prepared from ethylene oxide and the higher 1,2-epoxides, such as 1,2-propylene oxide, the butylene oxides, mixtures of these materials, and the corresponding glycols. As known in the art, the resulting products may be polyoxyalkylene diols or polyalkylene glycol derivatives, in which one or both of the terminal hydroxyl groups have been removed during the polymerization reaction or subsequently thereto, as by etherification or esterification to yield mono- or di-ether or mono- or di-ester groups or a combination of such terminal groups whereby certain desirable properties are imparted to the final polymeric mixture.

By way of illustration, U. S. Patent 2,448,664 describes the preparation of a polyoxypropylene polymeric mixture according to the equation

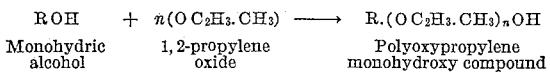

These products have molecular weights ranging from about 400 to 2,000 and higher, and are alleged to be useful as synthetic lubricants.

More recently polyoxyalkylene polymeric and copolymeric mixtures containing polymer units having more than two carbon atoms separating oxygen atoms in the polymer chain have been prepared and described. For example, U. S. Patent 2,520,733 describes the preparation of polymers and copolymers derived from trimethylene glycol.

The foregoing compounds, as well as additional polymeric materials contemplated by the invention, are further described in U. S. Patent 2,491,432.

As compared with mineral oils, the polyalkylene glycols possess certain superior properties, as a result of which they would be more extensively used but for their high cost. For example, the polyalkylene glycols have higher viscosity indices, and lower pour points, than mineral oils of comparable viscosity. A further additional property is that upon oxidation they tend to decompose into harmless volatile materials rather than to form complex insoluble engine deposits, their use in engine lubricating thus resulting in greater engine cleanliness.

It is also known that in general additives conventionally employed in combination with a mineral oil to improve one or more properties thereof, such as oxidation and corrosion inhibitors, detergents and the like, are often without effect when combined with the polyalkylene glycol polymers. Another disadvantage of the polyalkylene glycol polymers is their limited solubility in mineral oils. At relatively high temperatures, blends of mineral oil and polyalkylene glycol show phase separation, as manifested by haziness or cloudiness.

Notwithstanding the poor miscibility characteristics of blends of polyalkylene glycol polymeric material and mineral oil, the blends are capable of manifesting the desirable properties of the polymers. Moreover, certain conventional mineral oil additives have been found desirably to affect the polymer when incorporated in the polymeric material in the presence of mineral oil. For a number of reasons, therefore, and for the further reason of economy, it is desirable to form blends of mineral oil and polyalkylene glycol polymeric material having improved miscibility characteristics.

Now, in accordance with the invention, it has been found that the miscibility characteristics of blends of mineral oil and polyalkylene glycol polymeric material can be improved substantially by the bringing together of mineral oil and said polymeric material in the presence of a small amount of a polar solubilizing compound. More specifically, it has been found that the miscibility temperature, more fully described hereinafter, of mixtures or blends of mineral oil and polyalkylene glycol polymer can be considerably lowered by the incorporation therein of a small amount of a normally liquid ether having at least six aliphatic carbon atoms in the molecule.

More particularly, the ethers contemplated by the invention are ethers containing six or more aliphatic carbon atoms and free of polar substituents, such as amino or nitro groups. These polar radicals, by imparting greater polarity to the ether molecule than it already possesses, adversely affect the ether in its function of solubilizing polymer and mineral oil. However, substituent groups of little or no polarity, such as those consisting solely of carbon and hydrogen, e. g., benzene, are permitted. Thus, the ether oxygen may be attached to alkyl, alicyclic, alkaryl or arylalkyl groups, the alkyl portion of said groups containing at least six aliphatic carbon atoms.

In general it may be stated that the greater the number of carbon atoms in the ether molecule, the more pronounced the miscibility effects imparted to the mixture of mineral oil and polymer. Therefore, ethers having as many as 18 and more carbon atoms in the molecule are suitable in carrying out the invention. Since, however, aromatic carbon, e. g., a benzene ring, contributes little or no solubilizing effect to the ether molecule, the number of aromatic carbon atoms appearing in the ether molecule is accordingly ignored in determining the effective number of carbon atoms.

While thus far only ethers have been described, and are preferred, the sulfur analogue of the ethers, namely thioethers, of similar definition except that sulfur replaces oxygen therein, are not precluded from the broader aspects of the invention.

Specific examples of suitable solubilizing agents are di-n-propyl ether, di-isopropyl ether, di-n-amyl ether, ethyl-n-octyl ether, di-octyl ether, di-hexyl ether, ethyl-cyclohexyl ether, ethyl-cyclopentyl ether, o-methylcyclohexyl-methyl ether, phenylpropyl-butyl ether, isoamylphenyl-propyl ether, propylphenyl-propyl ether, isopropyl-butylphenyl ether and ethyl-isoamylphenyl ether, di-isobutyl sulfide, disec.amyl sulfide, di-isoamyl sulfide, di-n.heptyl sulfide, methyl cyclohexyl sulfide. The various isomers of these materials can also be employed.

It has been found that the amount of ether required to effect an improvement in the miscibility characteristics of polyalkylene glycol polymer and mineral oil blends is substantially independent of the proportions of mineral oil and polymer within a range of about 20 to about 80% by volume of either component. That is, either component can be present in the composition in an amount of about one-fourth to about four-fold the amount by volume of the other component, although for practical purposes an equal amount of either component is preferred. In general, the amount of solubilizing compound can vary from an amount of about 1% to about 10% by volume of the finished composition, an amount of about 2% to 5% being preferred. While greater amounts than about 10% can be employed, such amounts are not particularly desirable because they adversely affect the properties of the finished composition, such as viscosity index.

In order to obtain quantitative data on the effectiveness of the solubilizing agent to improve the miscibility of polymer and mineral oil, the following method and apparatus were employed: A double-walled test tube having an inside diameter of about 11 mm., an outside diameter of about 12 mm., and being about 9 cm. long, is provided with a cork stopper, and fitted with a thermometer. Sufficient sample is placed in the tube to cover the bulb of the thermometer (about 2 cc.), after which the test tube with contents is placed in a suitable cooling bath, the contents of the tube being continuously stirred with the thermometer. Phase separation is manifested by a sudden cloud formation, and the temperature at which the cloud appears is noted and recorded as the miscibility temperature.

The following examples are given to illustrate compositions prepared in accordance with the invention:

A mixture of polyalkylene glycol polymer material and mineral oil was prepared by mixing equal parts by volume of the polymer and mineral oil. The polymer was prepared from 1,2-propylene oxide and 2-ethylhexanol and had a viscosity of 61.2 SSU at 210° F. The mineral oil was a distillate cut obtained from naphthenic base crude, treated with aqueous phenol, sulfuric acid and percolated through fuller's earth, and had a viscosity of 65.9 SSU at 210° F.

To portions of the foregoing mixture there was added separately the solubilizing compounds indicated below, said compounds in all of the tabulated examples being added in an amount, 10% by volume, of the finished composition. After the incorporation of the solubilizing compound, the miscibility temperature was noted and recorded.

| Example | Ether | Miscibility Temp. |
|---|---|---|
| 1 | None | 60 |
| 2 | di-isopropyl ether | 25 |
| 3 | di-n-propyl ether | 27 |
| 4 | di-n-amyl ether | 26 |
| 5 | di-n-hexyl ether | 20 |
| 6 | di-n-octyl ether | 13 |
| 7 | ethylcyclohexyl ether | 25 |
| 8 | di-n-heptyl sulfide | 17 |
| 9 | phenylpropyl-butyl ether | 22 |
| 10 | isoamylphenyl-propyl ether | 26 |

*Example 11*

A composition consisting of 80 volume per cent of the polymer and 20 volume percent of the oil employed in the examples tabulated above had a miscibility temperature of 19° F. Addition of 10% by volume of the composition of di-n-amyl ether resulted in a composition having a miscibility temperature of −10° F.

On the other hand, 20 volume per cent of the same polymer and 80 volume per cent of the same oil resulted in a composition having a miscibility temperature of 53° F. Addition of 10 volume per cent of di-n.amyl ether lowered the miscibility temperature to 19° F.

*Example 12*

To equal proportions by volume of the polymer employed in obtaining the data tabulated above and of a mineral oil having a viscosity of 60.6 SSU at 210° F., there was added 10 volume per cent of di-isoamyl ether. The blend of mineral oil and polymer alone had a miscibility temperature of 123° F., whereas the finished blend had a miscibility temperature of 89° F. The mineral oil in this example was derived from a phenol, cresol and propane treated residuum of an intermediate base crude to give a waxy raffinate. The raffinate was dewaxed by means of methyl ethyl ketone, the dewaxed oil treated with clay and then fractionated to yield the finished oil.

*Example 13*

Polyalkylene glycol polymeric material was prepared from methanol and 1,2-propylene oxide and subsequently esterified with acetic anhydride, the finished polymer having a viscosity of 40.0 SSU at 210° F. To this there was added an equal volume of a spray oil having a viscosity of 34.1 SSU at 210° F. This resulted in a composition having a miscibility temperature of 30° F. Addition of 10 volume per cent of di-n.octyl ether resulted in a composition having a miscibility temperature of —4° F.

*Example 14*

A composition consisting of 45 volume per cent of the oil described in the example immediately above and 45 volume per cent of the 2-ethyl-hexanol initiated polymer employed in obtaining the tabulated data and 10 volume per cent of di-n-heptyl ether had a miscibility temperature of —35° F. Polymer and oil in equal proportions without the alcohol had a miscibility temperature of 0° F.

*Example 15*

A polymer was prepared from a mixture consisting of equal mol per cent proportions of ethylene oxide and 1,2-propylene oxide, employing octanol to initiate the polymerization reaction. The resulting polymer was esterified with acetic anhydride, the octanol-initiated ethylene oxide-propene oxide acetate polymer having a viscosity of 40.0 SSU at 210° F. This polymer was mixed with an equal volume of a mineral oil having a viscosity of 89.7 SSU at 210° F. and obtained from a naphthenic crude distillate treated with aqueous phenol, sulfuric acid and clay. The blend of polymer and oil had a miscibility temperature of 8° F. Addition of 10 volume per cent ethyl-cyclohexyl ether resulted in a finished composition having a miscibility temperature of —32° F.

*Example 16*

A water-initiated polypropylene oxide polymer having a viscosity of 62.0 SSU was blended with an equal amount of a spray oil having a viscosity of 36.6 SSU at 210° F. The miscibility temperature of the blend was 120° F. Addition of 10% by volume of the blend of phenylpropyl-n-butyl ether resulted in a composition having a miscibility temperature of 85° F.

*Example 17*

A polymer was prepared from stoichiometric proportions of ethylene oxide and isobutylene oxide, employing 2-butanol to initiate the polymerization reaction, the polymer being subsequently esterified with acetic anhydride to yield a product having a viscosity of 48.6 SSU at 210° F. Equal proportions of this polymer with the oil used in the tabulated examples gave a composition having a miscibility temperature of 82° F. Addition of 10% by volume of the blend of di-n.octyl ether resulted in a composition having a miscibility temperature of 46° F.

As indicated in the foregoing examples, the mineral oil can be any hydrocarbon oil of lubricating oil viscosity. It can be a straight mineral oil or a distillate derived from paraffinic, naphthenic, asphaltic or mixed-base crudes. Moreover, the oil may be one refined by conventional methods, such as solvent- or acid-treated oils or mixtures thereof. Also satisfactory for purposes of the present invention are synthetic oils such as those derived from the polymerization of olefins or the Fischer-Tropsch process. Various blended oils are also contemplated by the invention.

Obviously many modifications and variations of the invention as hereinbefore set forth may be made without departing from the spirit and scope thereof, and therefore only such limitations should be imposed as are indicated in the appended claims.

We claim:

1. Lubricating oil composition comprising a major proportion of a blend of hydrocarbon oil and polyalkylene glycol polymeric material of lubricating oil viscosity in an amount, by volume, of about one-fourth to about four-fold the amount of said hydrocarbon oil, and a minor amount, sufficient substantially to lower the miscibility temperature of said blend, of an ether having at least six aliphatic carbon atoms in the molecule, said ether being free of polar substituents, and being soluble in said blend at the miscibility temperature of said blend.

2. Composition substantially as described in claim 1, wherein the hydrocarbon oil is a mineral oil.

3. Composition substantially as described in claim 2, wherein the polyalkylene glycol polymeric material is a 1,2-polyalkylene glycol polymeric material.

4. Composition substantially as described in claim 3, wherein the 1,2-polyalkylene glycol polymeric material has at least one terminal group selected from the class consisting of ether and ester groups.

5. As a composition of matter, a blend of mineral lubricating oil and 1,2-polypropylene glycol polymeric material of lubricating oil viscosity in an amount, by volume, of about one-fourth to about four-fold the amount of said mineral oil, said blend containing in addition a minor amount, sufficient substantially to lower the miscibility temperature of said blend, of an ether having at least six aliphatic carbon atoms, said ether being free of polar substituents, and being soluble in said blend at the miscibility temperature of said blend.

6. Composition substantially as described in claim 5, wherein the 1,2-polypropylene glycol material has at least one terminal group selected from the class consisting of ether and ester groups.

7. Composition substantially as described in claim 6, wherein the 1,2-polypropylene glycol polymeric material has a terminal ether group.

WILLIAM T. STEWART.
ALFRED GOLDSCHMIDT.

REFERENCES CITED

The following references are of record in the file of this patent:

UNITED STATES PATENTS

| Number | Name | Date |
|---|---|---|
| 2,481,278 | Ballard et al. | Sept. 6, 1949 |
| 2,510,540 | Ballard et al. | June 6, 1950 |
| 2,520,733 | Morris et al. | Aug. 29, 1950 |
| 2,543,735 | Stewart et al. | Feb. 27, 1951 |

OTHER REFERENCES

"Ucon" Fluids and Lubricants—Carbide & Carbon Chem. Corp., N. Y., N. Y.—May 31, 1948—pp. 14 and 15.